United States Patent [19]
Damrow et al.

[11] Patent Number: 4,460,662
[45] Date of Patent: Jul. 17, 1984

[54] MOLYBDENUM-COATED ALUMINUM CATHODES FOR ALKALI METAL/SULFUR BATTERY CELLS

[75] Inventors: Paul A. Damrow, Concord; Floris Y. Tsang, Walnut Creek, both of Calif.

[73] Assignee: The Dow Chemical Company, Midland, Mich.

[21] Appl. No.: 494,595

[22] Filed: May 13, 1983

[51] Int. Cl.³ .............................................. H01M 4/36
[52] U.S. Cl. ..................................... 429/104; 429/122
[58] Field of Search ................ 429/104, 121, 122, 218

[56] References Cited

U.S. PATENT DOCUMENTS 3,985,575 10/1976 Ludwig ............................... 429/103
4,117,209 9/1978 Markin et al. ....................... 429/104

Primary Examiner—Charles F. Lefevour

[57] ABSTRACT

Alkali metal/sulfur battery cells, in which the cathodic current collector is a shaped article comprising an aluminum substrate coated with molybdenum, have longer service lives if the molybdenum is overcoated with a layer of molybdenum oxides comprising an outer portion consisting of $MoO_3$.

16 Claims, No Drawings

MOLYBDENUM-COATED ALUMINUM CATHODES FOR ALKALI METAL/SULFUR BATTERY CELLS

BACKGROUND OF THE INVENTION

Alkali metal/sulfur battery cells of a variety of configurations are now well known. In one configuration, a large number of hollow glass fiber lengths are employed as the electrolyte/membrane/divider between the (molten) alkali metal anode and the catholyte—a molten mixture of the sulfur "cathode" and alkali metal polysulfides of the type produced by the discharge reaction in the cell.

In the latter type of cells, the cathode, i.e., the cathodic current collector—generally takes the form of a spirally wrapped, metal foil—the adjacent wraps being spaced apart a distance somewhat more than the outer diameter of the fibers. The fibers are filled with the alkali metal and are vertically disposed, in parallel, between the wraps. The catholyte fills the spaces between the wraps not occupied by the fibers. The lower ends of the fibers are closed and the upper ends are open and terminate at the upper face of a "ceramic" tubesheet through which they pass in sealing engagement therewith. A reservoir space above the tubesheet contains more of the molten alkali metal, which flows into the fibers as the metal originally present in them is converted, during discharge of the cell, to cations—which migrate through the fiber walls into the catholyte. Electrons given up by the metal as it ionizes are conveyed through the unionized metal in the fibers and reservoir to an anode lead connected through an external circuit to a cathode lead. The electrons pass through the circuit (and leads) to the cathodic current collector (electron distributor), where they are taken up by sulfur to form sulfide ions in the catholyte.

The cathodic current collector can also take the form of a coiled strip of metal gauze or a large number of wire lengths vertically disposed between the fiber lengths in a "nail bed" array.

The foil, gauze or wire consist predominantly of aluminum and are coated with a thin layer of molybdenum disulfide, carbon or molybdenum metal, as disclosed in U.S. Pat. Nos. 3,749,603; 3,765,944 and 4,332,868, respectively. The presently preferred coating material is molybdenum.

Analogous Na/S cells in which the separator takes the form of a vertically disposed flat plate in which a plurality of parallel, vertical wells of capillary dimensions have been drilled out are disclosed in U.S. Pat. No. 3,915,741. The molten sodium is disposed in the wells and in a reservoir above them with which they communicate. The sulfur/sulfide catholyte is disposed around the plates in a stainless steel container and the cathodic current collector is a body of graphite fibers extending through the catholyte and electrically connected through a stainless steel pressure plate to the container.

Another type of Na/S cells in which the separator is in the form of vertically disposed hollow fibers are disclosed in U.S. Pat. No. 4,230,778. The fibers are filled with the catholyte, are externally wet with sodium and may or may not be spaced apart. Each fiber is sealed at both ends and the cathodic current is collected by a stainless steel or coated iron wire extending into each fiber through at least one of the seals. The coating on the coated wires is described only as being an "anti-corrosive layer".

U.S. Pat. No. 4,310,607 discloses a closely similar combination of closely packed hollow fibers bundled in parallel with "protectively-coated" aluminum wires extending into them as current collectors. The fibers are open at one end and are sealed together along their lengths in a manner leaving interstitial spaces between them except at their open-ended terminal portions. The latter portions pass through a tubesheet formed of the same glass as the fibers.

A variety of Na/S cells in which the anolyte/catholyte spaces are not of capillary dimensions are disclosed in the patents listed in the following tabulation. The cathodic current collecting means vary widely in configuration, internal structure or composition, as indicated in the summary descriptions given. The tabulation is organized into three main groups, according to the types of materials exposed to catholyte contact in the surfaces of the collector elements. The latter elements may or may not consist of or include container ("tank" or reservoir) walls. In the sole patent constituting a fourth "group", the collector means disclosed is not significantly different from others listed and the patent is listed only by reason of disclosing a different cell configuration.

Patents essentially redundant to others in the list, as to the collecting means, are not included in the Table.

TABLE 1

CONFIGURATION/STRUCTURE/COMPOSITION OF CATHODIC
CURRENT COLLECTORS IN PRIOR ART Na/S CELLS NOT OF
OR CLOSELY SIMILAR TO HOLLOW FIBER TYPE

| Cell Group No. | U.S. Pat. No. | Current Collector Description |
|---|---|---|
| I | 3,404,035 (1968) | Metal casing lined with Al or C or separate Al, C or S.S.[1] element connected to cathode lead. |
| | 3,883,367 (1975) | Catholyte distributed in matrix of graphite yarn in contact with S.S. casing. |
| | 3,959,013 (1976) | Casing of Al, steel or Fe/Ni/Co coated with Mo or C. |
| | 3,982,957 (1976) | Carbon fiber matrix in contact with graphite tube containing central Al rod and intervening layer of liquid Sn or Sn/Pb alloy. |
| | 4,048,394 (1977) | Porous carbon felt wrapped on central, Na-containing, solid electrolyte tube, spaced radially from vitreous carbon-coated graphite element which may be catholyte container wall or separate element. |
| | 4,049,885 (1977) | Catholyte in contact with graphite fibers twisted between aluminum wires connected to cathode lead. |
| | 4,053,689 | Catholyte in matrix of carbon felt rolled up with an |

TABLE 1-continued
CONFIGURATION/STRUCTURE/COMPOSITION OF CATHODIC CURRENT COLLECTORS IN PRIOR ART Na/S CELLS NOT OF OR CLOSELY SIMILAR TO HOLLOW FIBER TYPE

| Cell Group No. | U.S. Pat. No. | Current Collector Description |
|---|---|---|
| | (1977) | Mo- or Cr-coated Al foil which has uncoated Al tabs projecting from ends of roll for connection to cathode lead. |
| | 4,110,516 (1978) | Catholyte in conductive matrix in contact with Cr layer electroplated on pre-etched Al casing wall per se or after first electroplating the Al with zinc. |
| | 4,118,545 (1978) | Catholyte matrix consists of a mixture of alumina fibers with fibers consisting of or coated with carbon or graphite. In contact with conventional, conductive casing. Increased cell life claimed. Catholyte matrix consisting of graphite-coated wires which are Ni/Cr alloy or Ni/Cr alloy-coated Al or Cu. Matrix in contact with conventional, conductive casing. |
| | 4,131,226 (1979) | Conventional matrix in contact with foil lining conductive container wall and consisting of 347 S.S., or Mo- or Ni/Cr-coated mild steel. |
| | 4,169,120 (1979) | Catholyte in pores of porous, carbonized composite of chopped carbon fibers and a cured resin; in contact with conventional, conductive casing. |
| | 4,189,531 (1980) | Aluminum conductor coated with thin layer of electrically-conducting phenolic or poly(arylacetylene) resin. |
| | 4,213,933 (1980) | Nickel alloy (Inconel 600, for example) with firmly adhered coating of pyrolytic carbon. |
| | 4,232,098 (1980) | Ferrocarbon metal substrate coated with Fe/C/Cr alloy of duplex layer structure; inner layer <50% Cr, outer layer >60% Cr. |
| | 4,239,837 (1980) | Titanium or graphite foil glued to interior surface of metal casing wall with a conductive adhesive. |
| | 4,226,712 (1981) | A S.S. or Ni/Cr foil liner for a metallic casing, the foil being bonded to the casing and to an outer layer of at least 60% Cr, by diffused Cr. |
| | 4,287,664 (1981) | Like 4,131,226 but with at least two full wraps of the liner. |
| II | 4,048,390 (1977) | A ferrous metal substrate (Fe/Ni/Co, typically) aluminided by treatment with Al°, $NH_4F$ and $Al_2O_3$ remains conductive even though the aluminide reacts with the catholyte. |
| | 4,226,922 (1980) | Substrate metal such as low carbon steel is diffusion coated with iron boride. Boron sulfide or carbide provided in close proximity to boronized surface to plug pinholes and makeup for continuing diffusion of boron into substrate. |
| | 4,278,708 (1981) | A substrate metal having at least a surface layer of a transition series metal is coated with silicon carbide particles and heated (1000-1300° C.) until a layer of a tertiary compound of Si, SiC and the transition metal is formed by diffusion. |
| | 4,279,974 (1981) Honeycomb electrode configuration | The catholyte (preferably including powdered C) is in contact with a conductive element consisting of TiN (or of S.S. or fibrous carbon) and connected to the cathode lead of the cell. |
| III | 3,966,492 (1976) | A metal container wall or a separate element connected to the cathode lead is connected to a graphite felt matrix in which the catholyte is disposed. The portion of the matrix nearest the solid electrolyte/separator is coated with an oxide or sulfide of a group I, II or III metal, a transition metal or Sn, Pb, Sb and Bi. |
| | 3,985,575 (1976) | Different cathodic current collector/distributors ("electrodes") used for charge and discharge. Discharge electrode, preferentially wet by sulfur, is graphite. The charge electrode, preferentially wet by sodium polysulfates, is a porous conductor consisting of: (a) a substrate metal, such as S.S., coated with an oxide or sulfide of a Group I, II, III or transition group metal or Sn, Pb, Sb and Br; (b) surface oxidized graphite (i.e., graphite coated with graphite oxide); or (c), electrically-conductive intercalote compounds of graphite, such as graphite bromide. |
| | 4,117,209 (1978) | The catholyte matrix is a graphite felt connected to an aluminum element coated with an intermediate layer of Ni/Cr alloy and an outer layer of $TiO_2$ or other electronically conductive oxides. |

TABLE 1-continued
CONFIGURATION/STRUCTURE/COMPOSITION OF CATHODIC CURRENT COLLECTORS IN PRIOR ART Na/S CELLS NOT OF OR CLOSELY SIMILAR TO HOLLOW FIBER TYPE

| Cell Group No. | U.S. Pat. No. | Current Collector Description |
|---|---|---|
| | British 2,013-022 (1979) | A binary Ni/Cr alloy or a ternary Ni/Fe/Cr alloy is coated with a predominantly NiO film. |
| | 4,173,686 (1979) | An aluminum element is coated with aluminum oxide, except where penetrated by welds making metal to metal contact with a surrounding metal element having a Ni/Cr surface layer. |
| | 4,248,943 (1981) | The metallic current collector surfaces which would otherwise contact the catholyte are coated with a chromium/chromium oxide layer. |
| IV | 4,226,923 (1980) | Conventional cathodic current collecting means in a cell configuration which minimizes amount of sodium on one side of electrolyte (separates and maximizes access to other side by polysulfide component of catholyte during charging). |

Among the foregoing patents, those in group III are the most relevant to the present invention—which, to anticipate, is based on the discovery that the lifetimes of Na/S cells in which the cathodic current collector is a molybdenum-coated, aluminum foil are increased by baking the foil in air. The most pertinent patents in group III are U.S. Pat. Nos. 3,985,575 and 4,117,209.

The '575 patent teaches that metal substrates coated with metal oxides or sulfides are preferentially wetted by the polysulfide component of the sulfur/polysulfide catholyte—which is essential for the cathodic current collector (distributor, more accurately) to be used during charging of the cell. It is also essential, of course, that the surface layer consist, at least predominantly, of electronically-conductive oxides or sulfides.

The specific combination of an aluminum substrate, a molybdenum overlayer and a surface layer of a metal oxide is not disclosed in the patent. Although $MoS_2$ is specifically mentioned as a suitable surface layer, and $MoO_2$ is known to be a conductive oxide, the use of $MoO_2$ in the surface layer does not appear to be contemplated.

The '209 patent teaches the combination of an aluminum substrate, a chrome/nickel intermediate layer and a surface coating of a conductive metal oxide—most notably, $TiO_2$. Molybdenum oxides are not included in the list of other suitable oxides.

Neither of the foregoing patents suggests any effect of a metal oxide coating on cell life.

Although directed to production of a surface layer of a cathode-reactive oxide ($MoO_2$) on a conductive metal substrate (such as Al), rather than to a current collector per se, two patents—U.S. Pat. Nos. 4,245,017 and 4,281,048, not included in the preceding list—are relevant to the present invention as embodied in a coated foil. The $MoO_2$ layer disclosed in these patents functions as the sacrificial cathode in an $Li/MoO_2$ cell and the substrate metal functions as a cathodic current collector therein.

The $MoO_2$ is derived from a precursor coating of $MoS_2$ particles, by oxidizing the $MoS_2$ to $MoO_2$, or to $MoO_3$—which is then reduced to $MoO_2$. Since the oxidations must be carried out at temperatures below the melting point of the substrate metal, the oxidation temperature is far below the sintering temperature for molybdenum oxides. Thus, the $MoO_2$ product of either operation (or the intermediate $MoO_3$ layer) necessarily is obtained in the form of discrete particles. The $MoS_2$ particles are applied to the substrate as a suspension in oil. Most of the oil is removed in the baking (oxidation) process but carbonization also results and the $MoO_2$ (or $MoO_3$) particles apparently are bonded to the substrate metal (and each other, presumably) by the carbonization product.

The present applicants know of no prior art more relevant to their invention than the several patents referenced herein which disclose Mo/Al or $MoS_2$/Al for cathodic current collection in Na/S cells or the intermediate $MoO_3$ layer formed in one method of preparing cathode-reactive $MoO_2$ particles on an aluminum current collector for $Li/MoO_2$ cells. Thus, the latter art does not appear to contemplate $Al/Mo/MoO_3$ or $MoO_2$ structures having utility as cathodic current collectors in alkali metal/sulfur cells. Neither does said art suggest that the useful lifetime of an alkali metal/sulfur cell in which molybdenum-coated aluminum is used for cathodic current collection can be extended by formation of more than a superficial layer of molybdenum oxides on the exposed surface of the molybdenum.

OBJECTS OF THE INVENTION

The primary object is to increase the operating lifetime of alkali metal/sulfur cells in which molybdenum-coated aluminum is used for cathodic current collection.

A corollary object is to provide an improved cathodic current collector.

Another object is to provide, as said improved collector, an aluminum foil coated with an intermediate layer of molybdenum and an outer layer of non-particulate molybdenum oxides.

A further object is to provide a simple process for converting a molybdenum-coated aluminum foil to the latter, improved collector.

Still other objects will be made apparent to those knowledgeable in the art by the following specifications and claims.

SUMMARY OF THE INVENTION

The essence of the present invention is the discovery that alkali metal/sulfur battery cells in which the cathodic current collector is fabricated from molybdenum-coated aluminum are longer lived if the coated foil is baked in the presence of oxygen before being incorporated in the cell.

The invention may be broadly defined as an improvement in an alkali metal/sulfur battery cell having a cathodic current collector formed from molybdenum-coated aluminum, said improvement being a surface layer, on the molybdenum, of molybdenum oxides, of which the outermost portion consists essentially, to a depth of about 25 Å or more, of $MoO_3$.

The invention may be more precisely defined as a shaped article having utility as a cathodic current collector for alkali metal/sulfur battery cells, said article comprising (1) a metal substrate consisting essentially of aluminum or of a predominantly aluminum, aluminum/molybdenum mixture; (2) over said substrate, a first layer consisting essentially of molybdenum or of a predominantly molybdenum, aluminum/molybdenum mixture; (3) over said first layer, a second layer having the average composition $MoO_x$, x having a value within the range of from about 2 to about 2.9; and (4) a surface layer, about 25 Å or more thick, consisting essentially of $MoO_3$.

Also within the ambit of the invention is the process of fabricating a longer-lived alkali metal/sulfur battery cell which comprises incorporating therein the cathodic current collector of the preceding definition.

In another process aspect, the invention is the method of making the improved current collector which comprises:

(1) providing a shaped article having an outermost layer of molybdenum or of a predominantly molybdenum, aluminum/molybdenum mixture, on a substrate of aluminum or of a predominantly aluminum, aluminum/molybdenum mixture, and (2) contacting said outer layer with oxygen molecules at a temperature below the melting point of aluminum for a time period of about 10 minutes or longer.

In all embodiments of the invention, the current collector preferably is in a form, such as a foil, suitable for use in sodium/sulfur cells in which the electrolyte/separator is in the form of a multiplicity of hollow fibers.

Definitions of Terms

Herein, "consisting essentially of" means not including more than incidental amounts of impurities. The amounts of incidental impurities in commercial metals can be as much as several percent but are more typically 1% or less—as in the case of "pure" aluminum, which normally contains up to about 1% of silicon, C, iron, etc.

In the foregoing definitions of the invention, the oxide surface layer that normally is present on aluminum of molybdenum is not specifically recited, even though, in the case of aluminum at least, it may be as thick as 200 Å or more. However, this layer is to be assumed present—unless otherwise indicated—when reference is made to the metals per se.

The "mixtures" of aluminum and molybdenum referred to as such herein include but are not limited to true alloys. That is, shaped articles formed by sintering intimate mixtures of the two metal powders under intense pressure are also included.

The "substrate" does not have to be a monolithic body of aluminum (or Al/Mo). It can be a sheath around a core of any material which has the requisite strength and electrical conductivity.

The term "non-particulate" includes metal or oxide layers in which "grain boundaries" are observable by standard metalographic techniques.

It should be noted that the Å values given herein for the thicknesses of metal and metal oxide layers are relative estimates derived from the results of several different analytical methods: Electron Microscopy, Electron Diffraction, Atomic Absorption Spectroscopy, Auger Spectroscopy, Electron Spectroscopy for Chemical Analysis, Low Angle X-ray Diffraction and Rutherford Backscattering.

DETAILED DESCRIPTION

The cathodic current can take any form, appropriate to the cell it is to be incorporated in, in which a shaped element of molybdenum-coated aluminum can be fabricated and then surface oxidized according to the process of the present invention. For cells in which the electrolyte/separator takes the form of a plurality of closely-spaced hollow fibers which either do not contact each other or do so only as adjacent fibers in rows, the preferred collector configuration is that of a foil or gauze but individual lengths of wire disposed between the fibers or rows thereof are also suitable.

The same order of preference holds for foils, gauzes or wires disposed between thin plates of a cation-conductive glass or ceramic in which anolyte wells of capillary dimension extend from one edge of the plate towards (or through) another edge. For cells in which the electrolyte separator takes the form of a honeycomb, the cathodic collector preferably takes the form of lengths of wire or narrow ribbons of foil or gauze inserted in those compartments of the honeycomb in which the catholyte is disposed. In a cell in which the alkali metal is disposed interiorly of hollow fibers which are closely packed in parallel and the catholyte occupies the interstices between them, the cathodic current collector may consist of wire lengths inserted in the interstitial spaces and commonly connected to a cathodic "bus bar" or terminal.

If the "manifold" or other terminal means to which separate cathodic current collector elements are connected is exposed to catholyte, it may also consist of molybdenum-coated aluminum which has been surface oxidized. This applies to a cathode-container wall through which all or part of the cathode current passes.

As indicated by the foregoing definitions, the "aluminum" substrate can consist (essentially) of aluminum per se or of an aluminum/molybdenum mixture in which aluminum predominates. Among such mixtures, true, aluminum-rich alloys are preferred. According to M. Hansen (*Constitution of Binary Alloys; pp.* 114, 115; 2d ed., McGray-Hill, N.Y. 1958), evidence arguing for the existence of $MoAl_2$, $MoAl_3$, $MoAl_4$, $MoAl_5$ and $MoAl_{12}$ eutectics is in the literature. Preference, for the practice of the present invention, increases as the Al/Mo ratio goes up and aluminum at least 99% pure is most preferred.

Similarly, the "molybdenum" coating on the substrate can consist of molybdenum per se or of aluminum/molybdenum mixtures in which molybdenum predominates. The true, Mo-rich alloys of the two metals are preferred. According to Hansen (loc. cit.; pp. 115, 117), at least one definite Mo-rich eutectic, $Mo_3Al$, is known. Molybdenum per se, i.e.—at least 99% pure—is most preferred.

The molybdenum (or molybdenum and aluminum) coating can be formed on the substrate by any otherwise suitable method by which an adherent, conductive coating of adequate thickness can be produced. Such methods are well known and will not be described here. By "adequate thickness" is meant a thickness such that at least 100 Å of the coating metal will intervene between the substrate and the overlying oxides in the finished collector. (The latter oxides include the superficial surface layer (~20 Å normally present on molybdenum metal but the minimum residual thickness of Mo (or Mo/Al) does not include the Mo content of this superficial layer.) Preferably, the thickness of the intervening metal is about 200 Å or more. When the overlying oxides are to be formed from an outer portion of the initially unoxidized Mo (or Mo/Al) coating, the coating thickness must be increased to provide the Mo content of the intermediate ($MoO_x$) and outer ($MoO_3$) layers. Thus, the total thickness of the metal (per se) prior to oxidation should be at least 150 Å and preferably is at least 225 Å.

The intermediate (or sub) oxide layer (average composition $MoO_x$) is the most difficult to analyze but Auger Spectroscopy is considered to provide a reliable indication of the presence of this layer in molybdenum-coated aluminum foils which have been surface oxidized by baking in air ("air baking"). Depending on the baking temperature and duration, the thickness of this layer has been found to vary from about 140 Å (after 22 days at 100° C.) to about 1150 Å (after 65 minutes at 400° C.). The thickening apparently occurs primarily as a result of $MoO_2$ formation, although the content of $MoO_3$ in the portion of the intermediate layer immediately subjacent to the outer layer of $MoO_3$ probably increases too. $MoO_x$ thicknesses of less than 140 Å are not ruled out, since oxidation temperatures of less than 100° C. and/or baking times as brief as 10 minutes (or even less) are of course feasible.

The thickness of the outermost ($MoO_3$) layer should be greater than that of the monolayer of $MoO_3$ (~20 Å) normally present on exposed molybdenum surfaces. Thicknesses greater than about 50 Å have yet to be detected. Although greater thicknesses are not considered inherently unattainable, no benefit which would outweigh the corresponding increase in overall resistivity is apparent.

The oxidation process of the invention comprises exposing the surface of the molybdenum-coated aluminum (etc.) collector-to-be to oxygen molecules in an oxygen-containing fluid at a temperature such that the conversion of Mo (under the $MoO_3$ surface layer) to $MoO_2$ proceeds at a useful rate but melting or sagging of the substrate does not occur. The fluid may consist of oxygen, of solutions of oxygen in inert liquids or of mixtures of oxygen with other gases which do not detrimentally affect the process or the product thereof to an intolerable extent. Air is the preferred oxygen source material. For reasons of reproducibility, the oxidation preferably is carried out in an instrumented, oven-type enclosure with a thermostatically-controlled heat source and under controlled conditions of humidity, atmospheric purity, etc. Exemplary of suitable liquid oxygen source materials are solutions of oxygen in liquid fluorocarbons.

Depending on the design of the battery cell in which the cathodic current collector is to be employed, the oxidation may be carried out after the untreated collector has been incorporated in the cell (or in a sub-assembly thereof). In most instances, however, it will be much preferred to carry out the oxidation first.

The temperature can vary during the course of the oxidation but necessarily will be less than the melting point of the "aluminum" substrate. Preferably, the temperature does not exceed 650° C., even when the substrate consists of 99% of purer aluminum. The only inherent lower limit on temperature is that imposed by practical considerations as to reaction rate. At temperatures below about 50° C., the rate of oxidation of the molybdenum under the $MoO_3$ surface layer is very slow. Temperatures of at least 80° C. are preferred. The presently most preferred range of oxidation temperatures is from about 100° C. to about 400° C., for reasons of adequate reaction rates at the lower end of the range and for reasons of insulation requirements, equipment maintenance requirements, etc., at the upper end of the range.

The oxidation time period can be as long as a month or more (at temperatures of about 80°–100° C.) but may be as brief as 10 minutes, or even less, at temperatures of about 450° C. or higher.

Methods of providing the oxide layers other than that of the present invention are not ruled out. Thus, the "continuous film of gray molybdenum oxide" reportedly formed on molybdenum or molybdenum-rich alloy surfaces by the anodization process of U.S. Pat. No. 4,212,907 may be suitable. (The disclosed process is a pre-treatment for a substrate on which a metal plating is to be formed; the oxide film is not otherwise characterized.)

Greater cell longevity has actually been demonstrated only in cells in which the cathodic current collector is a spirally wound foil and the electrolyte/separator consists of hollow fibers aligned in parallel and disposed between the foil wraps, the fibers being sodium-filled and immersed in a sulfide/sulfur catholyte. However, it is the judgement of the present Applicants that the effect on longevity is not limited to cells in which sodium is the alkali metal and may be realized in cells of other designs—as exemplified by those disclosed in the patents listed in Table 1 herein.

EXAMPLES

The following examples are for purposes of illustration and are not to be construed as exhaustive of the scope of the present invention.

The molybdenum coatings referred to in the examples were applied to both sides of the Al foils by magnetron sputtering. The thicknesses of the metal and oxide layers on the foil samples analyzed were determined largely by ion bombardment process which removes the target material at a rate assumed to be substantially the same as that at which $Ta_2O_5$ is removed from a calibration standard at a given "machine setting". The accuracy of this procedure for Mo metal is only about ±50% but is relatively good for molybdenum oxides.

Example 1

Time/Temperature Effects on Thicknesses and Compositions of Layers in Oxidized Mo Coatings on Al Foils.

1145 (Food grade) aluminum foil, 0.5 mil thick and 4.5" wide, (manufactured by Reynolds Aluminum Co.) was used as received, with no surface conditioning or other pre-treatment. Both sides of a 70 meter length of foil, wound onto a 6" core, were simultaneously coated with Mo by planar magnetron sputter deposition in an argon matrix at pressures of $10^{-4}$ to $10^{-5}$ torr. One meter portions of the coated foil were cut from regions presumed to be uniform in morphology and thickness. Each test portion was loosely rolled and "immersed" in air in an insulated heater block, the temperature of which was maintained to within ±1% of the set value by a Trans-Met Visigraph controller, Model −2060. The interchange chamber of an inerted dry-box was used to cool down the oxidized samples. Different portions were treated for different lengths of time and at different temperatures as noted in Table 2 following. The compositions and relative thicknesses of the resulting Mo oxide and metal layers are also given in the Table.

TABLE 2
ANALYSES OF OXIDIZED CATHODE FOILS

| Temp. °C. | Time | Composition of Total Oxides Layer | Total Mo Oxides Thickness Å | Molybdenum Thickness Å(±50%) |
|---|---|---|---|---|
| 150 | ~30 da | $Al_2O_3$[1] | 50 | — |
| — | — | $MoO_3$[2] | ~20 | 500 |
| 100 | 22 da | $MoO_x$[3] | 140 | 500 |
| 150 | 22 da | $MoO_x$ | 340 | 400 |
| 200 | 22 da | $MoO_x$ | 1200 | 650 |
| 400 | 45 min | $MoO_x$ | 1000 | 150 |
| 400 | 65 min | $MoO_x$ | 1150 | 140 |

NOTES:
[1]Uncoated substrate foil.
[2]Mo-coated foil before deliberate oxidation.
[3]Here, $MoO_x$ represents the average composition for both the outer $MoO_3$ and inner Mo oxides/layers. x in each instance has a value between 2 and 3.

Study of the oxidized foils by the various analytical methods listed earlier herein resulted in the following conclusions. Each foil had a surface layer of $MoO_3$ having a thickness in the range of from about 30 to 50 Å. Underneath this, another oxide layer consisting predominantly of $MoO_2$ but including some higher oxides (overall average of between 2 and 3 oxygens per Mo atom) had formed. The thickness of the underlying Mo layer of course was decreased. It will be seen from the Table that the thickness of the oxide formed is several times the corresponding decrease in metal thickness.

Example 2

Lifetime Comparison of Cells with Unoxidized and Oxidized Mo-coated Al Collectors.

Two groups of ten cells each were compared. All cells were of the same basic design and, except for the oxidation treatment, were identical within the limits of reproducibility of the fabrication procedure. The cell design was that of the Dow 6 ampere hour experimental cell. This cell contains 2000, 50×80 micron hollow fibers made of modified sodium tetraborate glass, a modified basic oxide glass tubesheet disc and a cathodic current collector made of aluminum foil coated on both sides with about 500 Å of molybdenum metal. The ten cells designated as group A were standard for the latter design. The other tend, in which the collector foils had been air-baked at 300° C. for at least one hour, were designated as group B.

All cells were simultaneously put on test in a computerized, automated test facility and were then charge/-discharge cycled at 300° C. between 2.4 and 1.78 volts until they failed. With a couple of exceptions (discussed subsequently herein), the cycling was at a rate of 1 ampere; at this rate, each half-cycle was about 5 hours long. The results are given in Table 3.

TABLE 3
LIFETIME TESTING RESULTS
GROUP A - STANDARD CELLS

| Cell # | Discharge Res. (Ω) | Cap. (AH) | Discharge Cut-off OCV[1] | Lifetime Days | Lifetime Cycles |
|---|---|---|---|---|---|
| AV112 | .154 | 4.9 | 1.94 | 52 | 127 |
| AV116 | .155 | 4.8 | 1.94 | 37 | 93 |
| AV117 | .155 | 5.1 | 1.93 | 51 | 118 |
| AV134 | .144 | 5.1 | 1.93 | 70 | 158 |
| AV138 | .145 | 5.1 | 1.93 | 65 | 155 |
| AV139 | .149 | 5.4 | 1.93 | 36 | 82 |
| AV140 | .139 | 5.7 | 1.93 | 55 | 128 |
| AV141 | .133 | 5.3 | 1.92 | 67 | 147 |
| AV143 | .150 | 4.8 | 1.92 | 23 | 67 |
| AV145 | .145 | 4.3 | 1.92 | 18 | 49 |

GROUP B - OXIDIZED FOIL CELLS

| Cell # | Bake Time | Discharge Res. (Ω) | Cap. (AH) | Discharge Cut-off OCV[1] | Lifetime Days | Lifetime Cycles |
|---|---|---|---|---|---|---|
| AW5 | 24 hr. | .150–.175 | 4.3 | 1.93–1.96 | 244 | 680 |
| AW7 | 24 | .140–.181 | 4.3 | 1.92–1.96 | 179 | 505 |
| AW63 | 2 | .143–.156 | 5.1 | 1.93 | 107 | 276[2] |
| AW66 | 2 | .142–.156 | 5.1 | 1.93 | 96 | 241[3] |
| AW208 | 2 | .175 | 3.8 | 1.96 | 25 | 58 |
| AW211 | 2 | .130–.150 | 5.3 | 1.93 | 52 | 101 |
| AX2[4] | 120 | .155–.225 | 4.7 | 1.95–1.90 | 365 | 763[3] |
| AX6 | 1 | .162–.170 | 4.2 | 1.94–1.90 | 98 | 261 |
| AX4 | 1 | .192–.215 | 5.2 | 1.87–1.89 | 251 | 306 |
| AX8 | 2 | .150–.160 | 4.5 | 1.86–1.89 | 165 | 446 |

NOTES:
[1]Open circuit voltage at cut-off; determined without opening circuit (see U.S. Pat. No. 4,204,153). All cells discharged to closed circuit voltage of 1.78 v except AX6 and AX8 were discharged to 1.78 volts for the first 30 days, then to 1.72 volts until failure occurred.
[2]Failed due to test station malfunction.
[3]Deliberately terminated for examination of fiber bundles.
[4]AX2 cycled at 0.5 amp rate. AX4 amps cut from 1.0 to 0.67 after 150 days.

Discussion

The longest lifetime of a group A cell was 70 days and the group average lifetime was 47 days. In contrast, one group B cell had still not failed after 365 days and the average lifetime for the group (including 3 cells that were accidentally or deliberately terminated) was 158 days.

A comparison of the lifetime distribution for the two groups suggests that a faster developing mode of failure in the group A cells was not operative in the group B cells, so that failures of the latter cells were due to other, slower-developing causes. (It is not known that the faster acting cause of failure is or how air-baking counteracts it.)

It will be seen that those cells in which the foil had been baked longer than two hours were the longer lived cells in the group (B).

It should be noted that the lifetime improvement apparently was obtained at the cost of slightly lower cell capacities (ampere hours). The ohmic resistance of all cells having lifetimes in excess of 100 days progressively increased thereafter.

What is claimed is:

1. A shaped article having utility as a cathodic current collector for alkali metal/sulfur battery cells, said article comprising (1) a metal substrate consisting essentially of aluminum or of a predominantly aluminum, aluminum/molybdenum mixture; (2) over said substrate, a first layer at least 100 Å thick and consisting essentially of molybdenum or of a predominantly molybdenum, aluminum/molybdenum mixture; (3) over said first layer, a second layer having the average composition $MoO_x$, x having a value within the range of from about 2 to about 2.9; and (4) a surface layer, about 25 Å or more thick, consisting essentially of $MoO_3$.

2. An article according to claim 1 in which said substrate is a monolithic body consisting essentially of aluminum.

3. An article according to claim 2 in which said first layer consists essentially of molybdenum.

4. An article according to claim 3 in which said monolithic body is a foil and said first, second and surface layers are present on each side of the foil.

5. An article according to claim 4 in which the relative thicknesses of said layers are as follows: first layer, from about 140 to about 500 Å; second layer, from about 100 to about 1100 Å; surface layer, from about 30 to about 50 Å.

6. An article according to claim 1 in which said first layer consists essentially of molybdenum.

7. An article according to claim 1 in which said substrate is an aluminum-rich, binary alloy of aluminum and molybdenum.

8. An article according to claim 1 in which said first layer is a molybdenum-rich, binary alloy of aluminum and molybdenum.

9. An alkali metal/sulfur battery cell in which the cathodic current collector is a shaped article comprising (1) a metal substrate consisting essentially of aluminum or of a predominantly aluminum, aluminum/molybdenum mixture; (2) over said substrate, a first layer at least 100 Å thick and consisting essentially of molybdenum or of a predominantly molybdenum, aluminum/molybdenum mixture; (3) over said first layer, a second layer having the average composition $MoO_x$, x having a value within the range of from about 2 to about 2.9; and (4) a surface layer, about 25 Å or more thick, consisting essentially of $MoO_3$.

10. A cell according to claim 9 in which said substrate is a monolithic body.

11. A cell according to claim 10 in which said body consists essentially of aluminum.

12. A cell according to claim 11 in which said first layer consists essentially of molybdenum.

13. A cell according to claim 12 in which said monolithic body is a foil and said first, second and surface layers are present on both sides of the foil.

14. A cell as in claim 13 in which said foil is in the configuration of a loosely-wrapped spiral and the cell comprises an electrolyte/separator in the form of a plurality of spaced-apart hollow fiber lengths disposed in parallel between the foil wraps.

15. A cell as in claim 14 in which said alkali metal is sodium.

16. A cell as in claim 9 in which said alkali metal is sodium.

* * * * *

UNITED STATES PATENT AND TRADEMARK OFFICE
CERTIFICATE OF CORRECTION

PATENT NO. : 4,460,662
DATED : July 17, 1984
INVENTOR(S) : Paul A. Damrow and Floris Y. Tsang It is certified that error appears in the above—identified patent and that said Letters Patent is hereby corrected as shown below:

Column 7, line 55, delete "of" and insert -- or --;

Column 8, line 14, after the word "current" insert the word -- collector --;

Column 10, line 5, delete "of" and insert -- or --;

Column 10, line 50, after the word "by" insert -- an --;

Column 11, line 59, the word "tend" should be -- ten --;

Column 12, Table 3, Group B, the heading title "Bake Time" should read -- Air Bake Time --;

Column 12, line 49, the word "that" should be -- what --.

Signed and Sealed this

Twenty-sixth Day of February 1985

[SEAL]

*Attest:*

DONALD J. QUIGG

*Attesting Officer*   *Acting Commissioner of Patents and Trademarks*